(No Model.)
R. L. MUNGER & T. R. CAPWELL.
VEHICLE BRAKE MECHANISM.
No. 478,966.  Patented July 12, 1892.
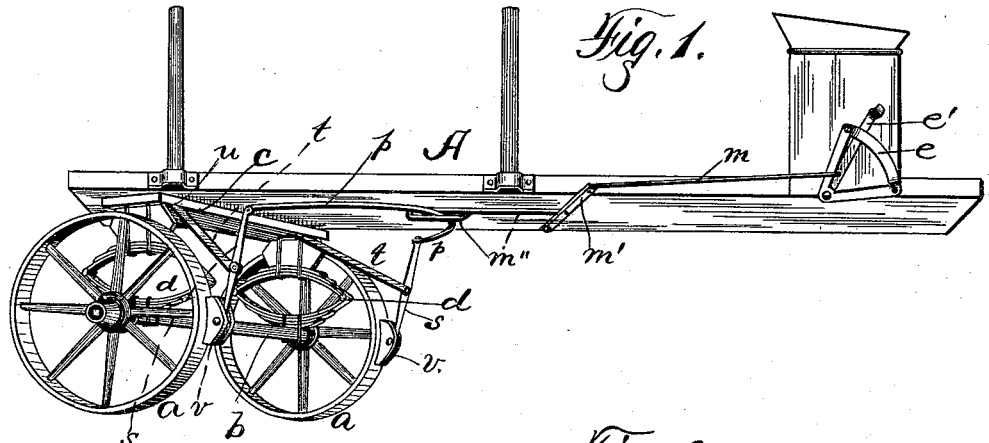
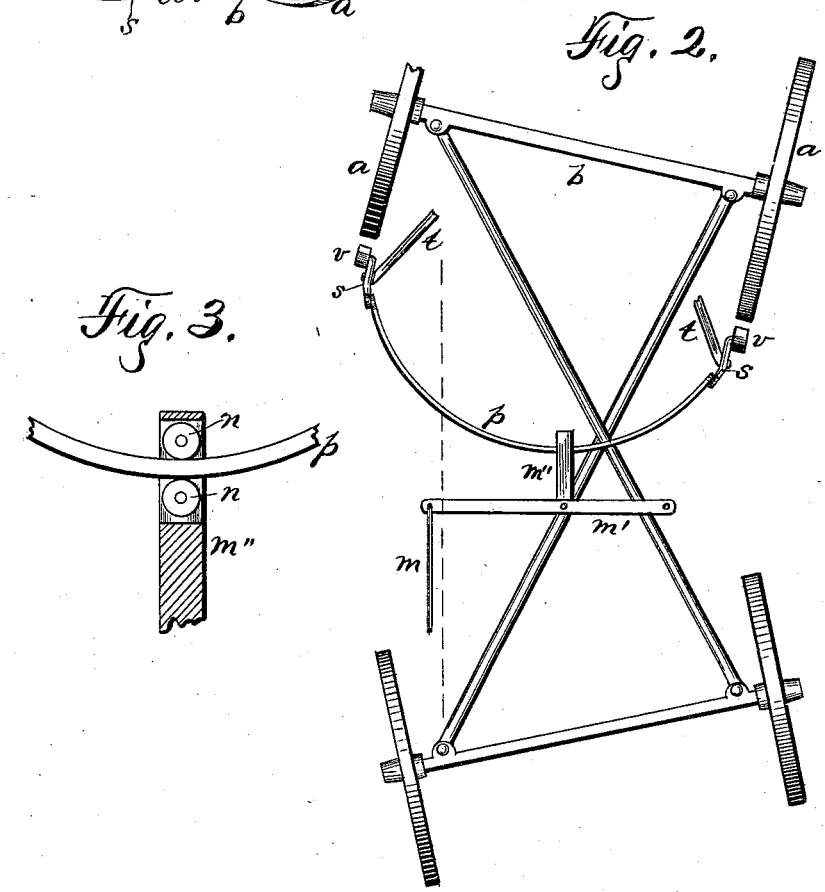
WITNESSES:
H. A. Carhart.
H. E. Bates.
INVENTORS
Royal L. Munger, &
Thomas R. Capwell,
BY
Smith & Denison
ATTORNEYS

UNITED STATES PATENT OFFICE.

ROYAL L. MUNGER AND THOMAS R. CAPWELL, OF DUNKIRK, NEW YORK, ASSIGNORS TO THE DUNKIRK WAGON COMPANY, OF SAME PLACE.

VEHICLE-BRAKE MECHANISM.

SPECIFICATION forming part of Letters Patent No. 478,966, dated July 12, 1892.

Application filed October 12, 1891. Serial No. 408,405. (No model.)

*To all whom it may concern:*

Be it known that we, ROYAL L. MUNGER and THOMAS R. CAPWELL, of Dunkirk, in the county of Chautauqua, in the State of New York, have invented new and useful Improvements in Vehicle-Brake Beams, of which the following, taken in connection with the accompanying drawings, is a full, clear, and exact description.

Our invention relates to vehicle-brakes, and particularly to that class which are adapted to be applied to wheels which are turned upon a pivotal king-bolt when the vehicle is driven upon a curve.

Our object is to produce a brake which can at any time be applied to the wheels of a vehicle where said wheels are adapted to turn upon a king-bolt or fifth-wheel mechanism when the vehicle is traveling upon a curve.

Our invention consists in the several novel features of construction and operation hereinafter described, and which are specifically set forth in the claims hereunto annexed.

It is constructed as follows, reference being had to the accompanying drawings, in which—

Figure 1 is a plan perspective of a vehicle-body, one set of wheels under one end thereof, and our brake mechanism mounted in position ready for operation. Fig. 2 is a top plan view of a vehicle-gear, showing the wheels turned and our brake ready to be applied to two of the wheels as turned. Fig. 3 is a sectional detail of the anti-friction guide mechanism for the brake-beam.

A is the vehicle body or bottom, mounted at one end upon a pair of wheels $a$, axle $b$, and turn-table or fifth-wheel mechanism $c$, of any ordinary construction, and springs $d$ may be used or not, as desired, all of which constitute the wheel-truck.

In Fig. 2 the axles are shown as connected by crossed reaches pivotally connected at their extremities to the axles.

Upon the front of the body we mount an ordinary quadrant $e$, and $e'$ is the foot-lever, pivotally mounted. The draw-bar $m$ is connected at one end to said brake-lever and at the other to the auxiliary lever $m'$, pivotally mounted under the bottom of the vehicle, and $m''$ is a draw-bar and guide combined, connected to the lever $m'$ and slotted transversely near its free end and provided with anti-friction rollers $n$ in said slot, between which the brake-beam $p$ passes. This beam is curved concentric with the king-bolt or fifth-wheel and its ends are hinged to the brake-shoe levers $s$, which are pivotally mounted upon and supported by the beams $t$, which are carried by the top board $u$ of the gear, and these levers carry the brake-shoes $v$ upon their lower ends. It will be readily seen that when the wheels and truck are turned, as in Fig. 2, the brake-beam will slide through the guide in the bar $m''$, and that whatever the position of these wheels may be the brake-shoes can be applied to them at any time by operating the foot-lever, which draws the brake-beam forward and throws the shoes back against the wheels.

What we claim as our invention, and desire to secure by Letters Patent, is—

1. The combination, with the wheels of a swinging truck, of brake-shoes connected to a brake-beam, a brake-beam supported by and swinging concentric with the truck, a guide through which said beam passes, and a lever system for operating said beam and shoes.

2. The combination, with the wheels of a swinging truck, of brake-shoes connected to the brake-beam, a brake-beam supported by and swinging concentric with the truck, a guide provided with anti-friction rollers, between which said beam passes, and a lever system for operating said beam and shoes.

In witness whereof we have hereunto set our hands this 6th day of October, 1891.

ROYAL L. MUNGER.
THOMAS R. CAPWELL.

In presence of—
ELTON D. WARNER,
L. F. STURNES.